United States Patent
Schafer et al.

(10) Patent No.: US 7,912,624 B2
(45) Date of Patent: Mar. 22, 2011

(54) SYNCHRONIZATION DEVICE FOR AN ENGINE

(75) Inventors: Jens Schafer, Herzogenaurach (DE); Heiko Dell, Wustenrot (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 21 days.

(21) Appl. No.: 12/296,968

(22) PCT Filed: Mar. 23, 2007

(86) PCT No.: PCT/EP2007/052806
§ 371 (c)(1), (2), (4) Date: Apr. 10, 2009

(87) PCT Pub. No.: WO2007/118758
PCT Pub. Date: Oct. 25, 2007

(65) Prior Publication Data
US 2009/0276145 A1 Nov. 5, 2009

(30) Foreign Application Priority Data
Apr. 12, 2006 (DE) .......................... 10 2006 017 232

(51) Int. Cl.
*F01L 9/04* (2006.01)
*F01L 1/34* (2006.01)
*F01L 1/02* (2006.01)

(52) U.S. Cl. .................. 701/105; 123/90.15; 123/90.11; 123/90.31

(58) Field of Classification Search ............... 123/90.15, 123/90.16, 90.17, 90.31, 90.11; 701/105; 74/567, 568 R, 568 T; 318/625
See application file for complete search history.

(56) References Cited

U.S. PATENT DOCUMENTS

| | | | | | |
|---|---|---|---|---|---|
| 5,289,805 | A | * | 3/1994 | Quinn et al. | 123/90.17 |
| 5,363,817 | A | * | 11/1994 | Ikeda et al. | 123/90.15 |
| 5,604,304 | A | * | 2/1997 | Kokubo et al. | 73/114.63 |
| 6,481,401 | B1 | * | 11/2002 | Schafer | 123/90.17 |
| 6,571,757 | B1 | | 6/2003 | Simpson | |
| 7,032,552 | B2 | * | 4/2006 | Schafer et al. | 123/90.17 |
| 7,036,474 | B2 | * | 5/2006 | Axmacher et al. | 123/90.31 |
| 7,079,939 | B2 | * | 7/2006 | Kataoka et al. | 701/112 |
| 7,152,561 | B2 | * | 12/2006 | Schafer et al. | 123/90.15 |

(Continued)

FOREIGN PATENT DOCUMENTS

DE 19903594 8/1999

(Continued)

*Primary Examiner* — Stephen K Cronin
*Assistant Examiner* — Raza Najmuddin
(74) *Attorney, Agent, or Firm* — Volpe and Koenig, PC

(57) ABSTRACT

A synchronization device for an engine is provided that has a first active sensor and a second active sensor. The first active sensor is adapted to determine an angular position of a first shaft and the second active sensor is adapted to determine the angular position of a second shaft. The first active sensor and the second active sensor are adapted to provide information on the state of the angular position of the first shaft and the second shaft or the angular position of the first shaft and the phase position between the first shaft and the second shaft to the control device. In addition, the control device is adapted to provide a control signal for setting a given phase difference between the first and the second shaft.

23 Claims, 2 Drawing Sheets

U.S. PATENT DOCUMENTS

| | | | |
|---|---|---|---|
| 7,201,124 B2 * | 4/2007 | Neubauer et al. | 123/90.17 |
| 7,222,593 B2 * | 5/2007 | Stork et al. | 123/90.15 |
| 2004/0011311 A1 | 1/2004 | Takahashi | |
| 2004/0211248 A1 * | 10/2004 | Kassner | 73/117.3 |
| 2005/0188935 A1 * | 9/2005 | Neubauer et al. | 123/90.17 |
| 2005/0211207 A1 * | 9/2005 | Urushihata et al. | 123/90.17 |
| 2006/0042578 A1 | 3/2006 | Izumi et al. | |
| 2007/0074692 A1 * | 4/2007 | Schafer et al. | 123/90.17 |

FOREIGN PATENT DOCUMENTS

| | | |
|---|---|---|
| DE | 10315317 | 3/2004 |
| DE | 102004005449 | 8/2005 |
| EP | 1630363 | 3/2006 |
| WO | 2004020795 | 3/2004 |
| WO | 2004027223 | 4/2004 |

* cited by examiner

SYNCHRONIZATION DEVICE FOR AN ENGINE

BACKGROUND

The present invention relates to a motor. In particular, the present invention relates to a synchronization device for a motor, a method for the synchronization of shafts in a motor, a computer-readable storage medium, and a program element.

A typical start-up process in modern combustion engines lasts, for example, one second. A general goal of automobile manufacturers is to shorten this time as much as possible, because this is considered as disruptive, e.g., due to NVH reasons (noise, vibration, harshness).

Systems with shortened start-up times are experiencing increased market acceptance. For example, when a stoplight changes, even in so-called stop-start systems, end consumers expect agility similar to that of conventional vehicles that do not shut down the motor while a stoplight is red. This also increases the sensed reliability.

From publication DE 10 2004 005 449 A1, a device is known for identifying the rotation of a timing wheel of an internal combustion engine.

From publication WO 2004/020795 A1, a control device is known for adjusting the rotary angle of a camshaft.

A recognition system for engine rotation is known from publication US 2006/0042578 A1.

SUMMARY

One objective of the present invention is to start a combustion engine quickly.

Accordingly, a synchronization device for a motor, a method for the synchronization of shafts in a motor, a computer-readable medium, and a program element are proposed.

According to one exemplary embodiment of the present invention, a synchronization device for a motor is provided. The synchronization device comprises a control device, a first active sensor, and a second active sensor. In this way, the first active sensor is designed to determine the angular position of a first shaft of the motor, while the second sensor is designed to determine the angular position of a second shaft. The first active sensor is further designed to provide the determined angular position of the first shaft to the control device. The second active sensor is designed to provide the angular position of the second shaft to the control device. Alternatively, the second active sensor is designed to determine the phase position of the first shaft relative to the second shaft and to provide the determined phase position to the control device.

The first active sensor and the second active sensor are designed to recognize a rotational speed of the shaft that lies at least between a given reference value for the rotational speed of the shaft and the standstill of the shaft. In other words, this means that the active sensor is designed for the recognition of all rotational speeds occurring in a combustion engine. However, the active sensor is also designed for identifying the rotational speed of lower rotational speeds that can occur between a standstill of the engine, that is, a rotational speed of zero, and a reference value of the rotational speed.

In addition, the first active sensor and the second active sensor are designed to recognize a reversal of the rotational direction of a shaft. A shaft can have, namely, two rotational directions. Consequently, the active sensor can identify the angular position of two shafts or the phase position of two shafts relative to each other. This recognition can be performed in both rotational directions of an axle in the same way, that is, independent of the rotational direction. The active sensor can also determine, in which of the two directions the shaft is turning and it can also recognize the angular position and phase position of the two axles for slow rotations in the other direction.

The phase position can be used together with the angular position of the first shaft, in order to determine the angular position of the second shaft, because a relationship can exist between the angular position of the second shaft and the phase position of the second shaft.

If the first shaft involves the camshaft of a motor and if the second shaft involves the crankshaft of a motor, the position of the piston in a cylinder can be determined by the angular position of the shafts. This means that it can be determined, in which cylinder of a motor the fuel is to be injected during a start-up process, using this knowledge of the position of the camshaft relative to the crankshaft. Thus, with reference to the crankshaft length, it can be determined which cylinder is in an intake state, i.e., in which cylinder the piston is moving away from the cylinder head. With reference to the camshaft position, it can be determined which valve is opened for the intake of air. In this way, the cylinder is determined, in which the fuel is to be injected, in order to accelerate the motor start. Because the combustion cycle involves a cyclical process, the sequence of the cylinder can be determined, in which fuel is to be injected in the following process steps. A slow synchronization process can thus be avoided.

The control device is designed to evaluate the provided angular position information of the first shaft and the information on the phase position of the first and the second shaft or the angular position information of the first shaft and the second shaft and to provide from this information a control signal for setting a given phase difference between the first shaft and the second shaft. The given phase difference can be given for efficient fuel consumption. The control device can also determine the sequence of the cylinders, in which the fuel is to be injected.

An active sensor or an active shaft-state device can be designed to determine an angular position of a shaft or a phase difference between a first shaft and a second shaft directly.

Here, an active sensor should be understood to be a sensor that has a high phase resolution or angular position resolution. The phase resolution or the angular position resolution of an active sensor can equal, for example, 1° and an active sensor can recognize, for example, a change in phase position or change in angular position in steps of 0.1°. Due to this high resolution, an active sensor can differ from a conventional sensor.

The active sensor can fulfill additional criteria. For example, an active sensor can have a high phase resolution of, for example, 5° CMS, that is, 5° with respect to the camshaft, or 5° E-motor, that is, 5° with respect to the electric motor. Furthermore, an active sensor can recognize, for example, a change in phase position or a change in angular position in steps of 0.1° CKS, that is, 0.1° with respect to the crankshaft.

An active sensor can also allow a continuous monitoring function. This means that an active sensor can allow the monitoring of the phase difference or the angular position of the first shaft and the second shaft even if, for example, the ignition of a motor has been turned off.

In addition, an active sensor of slow phase changes or slow angular position changes can be recognized and it can also recognize phase changes or angular phase changes at slow rotational speeds of the first shaft and the second shaft. Consequently, flanks of a timer can be recognized even at a slow rotational speed of a shaft. A slow change in phase or a slow change in angular position lies, for example, in a range from 0° CKS/min to 5° CKS/min or in a range from 0° CKS/min to 10° CKS/min. A slow or low rotational speed is, for example, a rotational speed of 0 rpm to 50 rpm or from 0 rpm to 80 rpm. Here, the rotational speed can be the rotational speed of one shaft and, in particular, the engine speed.

The active sensor can recognize the rotational direction or the change in rotational direction of a shaft even at a slow rotational speed. In other words, an active sensor also recognizes the reverse rotation of one of the first shaft and the second shaft.

The active sensor can here have at least one of the criteria of high resolution, continuous monitoring function, flank recognition at a low rotational speed and reverse rotation recognition.

An angular position can designate, for example, the angle relative to a fixed reference position. The angular position can be recognized by means of marking formed at the reference position.

In the scope of the present text, the state of a shaft should be understood to be a movement state of a shaft. This movement state can be an angular position of a shaft at a certain time, a rotational speed, a certain number of pulses, or phase information of a shaft.

According to another exemplary embodiment of the present invention, a method for the synchronization of shafts in a motor during the motor startup or motor stop phases will be specified. At first, an angular position of a first shaft is determined by means of a first active sensor and an angular position of a second shaft is determined by means of a second active sensor. The angular position of the first shaft and the second shaft is provided to a control device. As an alternative to the determination of the angular position of the second shaft, a phase position between the first and the second shaft can be determined and provided to the control device. Based on this position, the control device determines a control signal and provides this control signal for setting a given phase difference between the first and the second shaft. The control signal can be used for regulating the phase difference to a desired value. The first active sensor (215) and the second active sensor (218, 220) are designed to also recognize a shaft rotational speed between a reference value for the shaft rotational speed and the shaft standstill. In addition, the first active sensor (215) and the second active sensor (218, 220) are designed to recognize a reversal of the shaft rotational direction.

According to yet another embodiment of the present invention, a computer readable medium is specified, on which a program is stored that controls the processing steps specified above when the program is executed by a processor.

According to yet another embodiment of the present invention, a program element for synchronizing shafts is specified, wherein this program element controls the processing steps specified above when the program element is executed or processed by a processor.

Through the use of the present invention, a phase-difference signal can be generated as a control signal that can be used as a control signal for setting a phase difference between two shafts. One of the two shafts can be a camshaft of a combustion engine and the other shaft can be a crankshaft of a combustion engine.

The start-up duration of a combustion engine can equal, for example, one second, wherein this start-up duration can be assembled from a time portion for the synchronization of a control device and the actual start-up process that leads to ignitions of the motor. A start-up process can happen in a stop-start system when the engine is turned off while a stoplight is red.

One reason for turning off the engine can be to reduce fuel consumption or to reduce pollutant emissions. Especially in hybrid vehicles, the engine can be turned off when the vehicle is at a standstill, as given, for example, when a stoplight is red, and it becomes necessary to start the engine as quickly as possible afterwards.

A stop-start system is a system that automatically recognizes that a motor and, in particular, a vehicle or an automobile with an engine, is found in a stopped phase. The stop-start system can automatically turn off the engine when the stopped phase is recognized, for example, by a reduction in the engine speed. As soon as the vehicle is set in motion again, the stop-start system can start the engine again.

For starting, it can be necessary for the crankshaft of the engine to be synchronized with the camshaft of the motor. Through synchronization, the course of combustion in the combustion engine can be influenced. Thus, through the synchronization a given opening and closing of the valves can be achieved. In this way, the start-up process can be influenced with respect to, for example, emissions, consumption, and load. The synchronization can be performed by a control device. Synchronicity between the crankshaft and the camshaft can be given when a given allocation, i.e., a relationship of the crankshaft position and the camshaft position, is achieved.

For allocation of the crankshaft position and the camshaft position, the state or the angular position of the first shaft and the state or the angular position of the second shaft can be referenced. For example, the allocation of the crankshaft position and the camshaft position can be determined after detection of characteristic features on the camshaft or the crankshaft. Characteristic features that can be found on a shaft can be, for example, missing teeth in a timing wheel (e.g., 60-2 teeth), in particular, a toothed timing wheel or sensor target wheel or edge detection of timing wheels. For example, a half moon-shaped identifier can be formed on a shaft, in order to determine an angle of the shaft.

The shutdown process of a combustion engine can be subject to large variation. This means that the shutdown position of a piston is stochastic when the motor is turned off in the stopped phase. This can mean that the exact position of the piston and thus the angle of the crankshaft connected to the piston are possibly not predictable. For example, in one cylinder of the combustion engine, in which a piston is guided, a high pressure can still be present up to ca. one second after the engine shutdown. After shutdown of the engine, the engine can have an engine speed of 0 revolutions per minute (rpm or $\min^{-1}$). The pressure still present in the piston, however, can lead to an uncontrolled depressurization process due to resetting of the crankshaft, due to which new synchronization can be necessary.

For example, the crankshaft can even turn backwards, for example, in the last section of the shutdown process. That is, in the last section of the shutdown process, the crankshaft can rotate in a direction that is opposite the direction that is typical for the operation of the engine. The reverse rotation can equal a value of, for example, 50 to 70 degrees CKS (degrees crankshaft). Here one degree CKS means a rotation of the crankshaft by one degree relative to a reference position.

Due to the low rotational speeds of the crankshaft or camshaft occurring in the shutdown process, it can happen that conventional crankshaft sensors cannot detect the rotation, in particular, the reverse rotation of the crankshaft. Consequently, for low rotational speeds in the region of zero revolutions per minute (rpm), conventional crankshaft sensors can be blind, i.e., cannot recognize rotational movement of the shaft despite the existence of rotational movement.

Through the use of a synchronization device, an angular position can also be traced during a standstill of the engine with the first sensor, with the second sensor, and with the control device design, in particular, the control device. It can be avoided, for example, that during the stopped phase of the engine, the synchronization or synchronicity between the first shaft and the second shaft, in particular, the synchronization between the crankshaft and the camshaft, can be lost.

To avoid the loss of synchronization, the first active sensor and the second active sensor can also determine the angular position, which can be an example for a state of a shaft, during the stopped phase of the engine. The active sensors can also recognize the reverse rotation of the crankshaft or the camshaft. The reverse rotation of the crankshaft and the camshaft can have, in particular for Otto engines, different magnitudes.

The first active sensor and the second active sensor can be designed in such a way to also be able to forward the state of the shafts to the control device during a stopped phase of the engine, i.e., for a shaft rotation of essentially zero revolutions per minute. Therefore, the synchronization of the camshaft and the crankshaft can also be maintained during a stopped phase of the engine. Consequently, the time period for the synchronization of the camshaft and the crankshaft and the synchronization of the control device, in particular, the control device, can be eliminated for every following startup of the engine.

Also, during a longer shutdown period or stopped phase of the engine, the synchronization can be maintained, whereby the initial startup of the engine can also take place without the time period for synchronization. Here an initial startup of the engine is to be understood that the engine has been shutdown with the shutdown of the ignition. An initial startup of the engine can be required, for example, after a parking process.

During this interruption phase, however, the synchronization device or the control device, can further ensure for the synchronization of the shafts. For this purpose, however, it can also be necessary to provide energy to the control device while the engine is shutdown. Maintaining the synchronization or synchronicity can take place, for example, through the use of EVT components (electromechanical valve timing). In contrast to a hydraulic camshaft adjustment system, in an EVT system, the adjustment of the camshaft can take place relative to the crankshaft using an electric motor.

Through the synchronization, the camshaft and the crankshaft can be shutdown relative to each other in such a way that a startup of the engine can be accelerated in the first ignition process. Therefore, the duration of the engine startup can also be approximately halved for subsequent startups. This means that for a normal start-up duration of one second, the start-up process of a system or of a combustion engine can be reduced to ca. 0.5 seconds by a synchronization device.

The synchronization device for the engine comprises a first active sensor that is designed to detect the angular position of a first shaft, a second active sensor that is designed to detect the angular position of a second shaft, and a control device. Here, the first active sensor is designed to provide the angular position of the first shaft to the control device and the second sensor is designed to provide the angular position of the second shaft to the control device. The control device is designed to evaluate the angular position information received by the active sensors and to provide a control signal for setting a given phase difference between the first shaft and the second shaft.

A state of a shaft or the state of a phase position between two shafts can be detected, for example, magnetically, optically, or electrically with a corresponding sensor. The state can also be detected indirectly by a pressure in a cylinder of an engine or by knocking signals of an engine.

According to another exemplary embodiment of the present invention, the first active sensor and the second active sensor are further designed in such a way to allow continuous monitoring of the angular position of the first shaft and the angular position of the second shaft or the phase position of the first shaft relative to the second shaft during a stopped phase of a rotation of the first shaft and the second shaft.

Consequently, the synchronicity of the angular positions of the first shaft relative to the angular position of the second shaft can also be monitored during a standstill.

According to another exemplary embodiment of the present invention, the synchronization device has a third sensor, wherein the third sensor is designed for determining the angular position of a third shaft. The third sensor is here designed in such a way that the determined information on the angular position of the third shaft is provided to the control device.

Determining the angular position can also be performed by measurement, but also by a calculation from known dependencies in connection with another measured variable. For example, the angular position can be determined with reference to a number of edges or by a gear ratio. The third sensor can increase the accuracy for determining the angular position and can be constructed as a passive or active sensor. Here, a sensor already provided on a shaft can be used.

Furthermore, according to another embodiment of the present invention, the third sensor is an active sensor.

According to another exemplary embodiment of the present invention, a synchronization device is specified that comprises an adjustment element coupled with a third shaft. The third shaft is here coupled kinematically with the first and the second shaft. Here, the adjustment element and, in particular, the kinematic coupling are designed in such a way that the given phase angle or the given phase difference can be adjusted by accelerating or braking the third shaft.

The first shaft, the second shaft, and the third shaft can be, for example, shafts of a planetary gear, whereby a kinematic coupling can be achieved. Here, a coupling of the shafts relative to each other can be realized by gears attached to the shafts. The ratio of rotational speeds of the corresponding shafts, the number of teeth, or the periphery is determined by the gear ratio. The gear ratio, that is, the ratio of the number of teeth of the gears of the planetary gear or the rotational speeds of the shafts to each other can be determined by a fundamental gear equation.

By providing the state information or the angular position of the third shaft, a phase difference of the first shaft to the second shaft can be determined, even if an active sensor is arranged on only one of the first shaft or the second shaft. The three shafts can be, namely, components of a triple-shaft gear unit with a fixed gear ratio. The three shafts can involve the crankshaft of an engine, the camshaft of an engine, or the adjustment shaft of an EVT system. The allocation of the shafts relative to each other can be performed arbitrarily relative to each other. An EVT system is here designed in such a way that a phase angle between the crankshaft and the camshaft can be set by a rotation of the adjustment shaft. The adjustment of the adjustment shaft can also be performed by an electric motor.

The angular position of the third shaft can also be detected with an auxiliary sensor. The auxiliary sensor can determine the state of one shaft remote from the shaft. This means that, for determining the state of the shaft, the auxiliary sensor does not directly access the shaft whose state is to be determined, but instead can determine the state of the shaft by a transferred shaft feature. The auxiliary sensor can also be arranged on the same shaft as a main sensor, for example, the first active sensor or the second active sensor. Here, the auxiliary sensor can be arranged parallel to or in extension to another sensor. The auxiliary sensor can collect additional information on the state of the shaft.

The first active sensor, the second active sensor, and the third sensor can have one sensor or a plurality of sensors or sensor elements, wherein the use of a plurality of sensors on one shaft can increase the accuracy of the provided information. A combination of active sensors and passive sensors can also be used. For example, through the use of three Hall sensors that are arranged in sequence in an electric motor and that are excited by the permanent magnets of the electric motor, the rotational direction of a shaft connected to the electric motor can be recognized. The three sensors can here be considered a composite sensor.

According to yet another embodiment of the present invention, a synchronization device is provided, wherein the adjustment element is designed to set the phase difference between the first shaft and the second shaft using the third shaft.

This means that the adjuster or the adjustment element does not act directly on the first shaft and the second shaft, in order to set a phase difference between the first shaft and the second shaft, but instead the adjustment device can also access a shaft coupled with the first shaft and the second shaft.

According to yet another embodiment of the present invention, a synchronization device is provided, wherein the adjustment element is constructed as an electric motor.

Here, the electric motor can have a first operating state, in which the electric motor converts electrical energy into a force. In this first operating state, the electric motor acts as an actuator.

Furthermore, the electric motor can have a second operating state, in which the electric motor draws energy from the system with a combustion engine, a first shaft, and a second shaft. For drawing energy, the electric motor can operate as a brake. Here, the rotational movement of a shaft is braked. The electric motor consequently operates as a generator.

The third shaft can have both an adjustment element and also a sensor. The adjustment element and the sensor can be combined integrally into one element.

In other words, this means that the state of the first shaft and the state of the second shaft can be determined by the first active sensor and the second active sensor and the phase difference between the first shaft and the second shaft can be set by another shaft. On the other hand, through the use of the combination of the first active sensor and the third sensor or the combination of the second active sensor with the third sensor, the state of the first and the second shaft can be determined. The phase setting between the first shaft and the second shaft can also be performed by the third shaft.

According to yet another embodiment of the present invention, energy fed to the adjustment element or the phase setting device can be limited.

The adjustment element can require energy to set the phase difference between the first shaft and the second shaft. This energy can involve electrical energy or electrical power. For use of a combustion engine in a motor vehicle, the power supply of the adjustment element can be realized by the onboard power network. As a function of the force to be applied for the adjustment, a correspondingly high energy can be required. Therefore, the entire energy stored in the onboard power network could be consumed for the adjustment.

Consequently, in the adjustment of the adjustment element or the phase setting device, it can be necessary that the supplied energy is limited. Here, dynamic and static limits can be possible. Below, the difference between a static and a dynamic limit shall be explained.

Here, a static limit should be understood in that the limit of the applied power (e.g., electrical power as a product from the current and the voltage V×I) is limited to a static value. This means that the static value is not changed as a function of another variable, but instead that it is statically fixed. The static limit can be fixed, for example, by a fixed pulse duty ratio for a power supply operated by means of PWM (pulse width modulation) for an electric motor, a phase adjustment device, or phase setting device. The electrical power can also be determined statically, for example, by setting a maximum permissible current.

For a dynamic limit, the power applied in the adjustment element or the phase setting device can be changed as a function of a function or another variable. The limit can be performed, for example, linearly as a function of time or as a function of n-th order of other externally measured or internally calculated variables. For example, the power supply can be a relative voltage level of the onboard power supply with respect to a full battery level.

Both for a static limit and also for a dynamic limit, a limit can also be realized at zero, that is, no power.

In other words, a synchronization device is provided, wherein at least the first sensor and the second sensor are active sensors.

Here, an active sensor should be understood to be a sensor that can satisfy several criteria. An active sensor can have a high resolution. A high resolution should be understood that an active sensor detects, for example, eight or more than eight edges for one shaft rotation. A high resolution can also be understood to be, for example, 60 teeth of a gear attached to a shaft, wherein the gear can also have gaps.

An active sensor can also provide a continuous monitoring function. This means that an active sensor can be used for monitoring the shaft or for providing the state of a shaft also without the presence of energy, for example, when the ignition of an engine is turned off. Thus, for example, it can be avoided that when the engine is turned off, a phase difference between the crankshaft and the camshaft can be generated. A phase shift between the crankshaft and the camshaft in the shutdown state could be generated when an automobile is pushed with a combustion engine in gear and the rotation of a shaft or the shafts relative to each other is not recognized due to the sensor being turned off.

An active sensor can also recognize an edge for a rotational speed that tends toward zero revolutions per minute. That is, even for slow revolutions, the state of the shaft can always be identified by an active sensor.

In addition, an active sensor can also recognize the reverse rotation of a shaft. A reverse rotation can be understood in that, during operation, the shaft of an engine first moves in one direction, while the shaft is turned in the opposite direction when the engine is turned off and at slow rotational speeds. An active sensor can also allow continuous monitoring of the relative adjustment angle between the crankshaft and the camshaft during stop-start operation.

In contrast to an active sensor, a passive sensor should designate a sensor that has essentially no reverse-rotation recognition and that cannot detect a rotational speed that tends toward zero revolutions per minute. Thus, a passive sensor is virtually blind for low rotational speeds. A minimal, low, or slow rotational speed is, for example, a rotational speed between 0 revolutions/min and 50 revolutions/min.

In addition to the first active sensor and the second active sensor, at least one additional passive sensor can be used.

According to another exemplary embodiment of the present invention, the adjustment element comprises a sensor, wherein the sensor is selected from the group consisting of the first active sensor, the second active sensor, and the third sensor.

According to yet another embodiment of the present invention, a synchronization device is specified that also has a phase-holding device designed to maintain the given phase difference between the first shaft and the second shaft. As an alternative or also in parallel to adjusting the phase angle by the synchronization device and through the adjustment element or the phase setting device during the entire stop and start phase, other measures for holding or for the regulated adjustment of the phase can also be realized. For example, a phase-holding device can cause mechanical locking of the adjustment mechanism.

For example, when the engine is stopped, mechanical locking and fixing of the phase offset between the first shaft and the second shaft can be realized. Thus, for example, it can be avoided that by pushing a turned-off vehicle, a phase shift can be performed between the first and the second shaft.

In addition, it is possible to clamp the adjuster, the phase setting device, or the phase adjustment device that could be constructed as an electric motor.

Holding the phase or the phase position can also be realized by pretensioning through the use of a catch. Here, a shaft is pressed, for example, against by a stop and can be prevented from rotating. Another possibility for holding the phase can be achieved through the installation of an active brake that can be fixed after setting the given phase difference and thus the maintenance of a fixed phase shift can be guaranteed.

According to yet another embodiment of the invention, the adjustment element is constructed for setting a phase difference between the first and the second shaft in an engine shutdown process.

Thus, in the final shutdown of an engine, a desired phase difference can be set between the first shaft and the second shaft. For this purpose, for example, a phase holding device can be used and thus the desired phase difference for the initial engine startup after the final shutdown of the engine is provided. Consequently, the initial engine start-up process can be accelerated. Alternatively, it can be provided that during the time duration of the shutdown process, the phase difference is held constant or controlled continuously by the adjustment element or the phase setting device.

According to yet another embodiment of the invention, a synchronization device is provided that is activated starting at an engine speed lying between the reference rotational speed of the engine and the standstill of the engine. The engine speed can here be determined indirectly by determining the rotational speed of a shaft.

For setting a phase difference between the first and the second shaft, it can be necessary to provide energy. In order not to provide energy for regulating the phase position between the first shaft and the second shaft during the entire operating time, the synchronization device can be switched on only starting at a minimal or low engine speed. Here, a low engine speed can be a rotational speed in the region of zero revolutions per minute up to the reference rotational speed or the reference value of the rotational speed. Thus, only in the time span of the shutdown of the engine can a favorable phase difference between the crankshaft and the camshaft be set for the next startup.

An adjustment element can be used not only as an actuator for adjusting a phase difference, but instead the state or the movement of a shaft can also be determined by an adjustment element or an electric motor. For this purpose, for example, in a commutator-less motor or electric motor, i.e., a motor without a commutator, an inductive current can be used in the motor windings, whereby the adjustment element can be designed as an active sensor.

According to yet another embodiment of the present invention, the adjustment element or the electric motor can have a plurality of sensor elements. Thus, through the use of the phase adjustment device, a reverse rotation of a shaft can be recognized. A commutator-less electric motor can have permanent magnets. The permanent magnets can excite Hall sensors that are arranged on the electric motor in a certain sequence. The sequence can be evaluated by a control device and thus can determine the direction of movement of the motor. In addition, the resolution of a sensor can be improved, in that, instead of one sensor, several sensors are used.

According to another exemplary embodiment of the present invention, a synchronization device is specified, wherein at least one of the sensors is constructed as a magnetic field sensor. Furthermore, it is possible to use an optical sensor.

A magnetic field sensor can be, for example, a Hall sensor or a magnetoresistive sensor (MR sensor). A magnetic field sensor can allow edge detection also at a low rotational speed.

According to another embodiment of the present invention, the synchronization device comprises a memory device in which information on the phase difference between the first and second shaft can be stored.

Thus, in a non-volatile memory, despite the shutdown of a current supply, the desired phase difference for the next startup of the engine can be stored and recalled. Consequently, the desired phase difference between the two shafts can be set quickly and thus the start-up process of the engine can be accelerated.

According to another embodiment of the present invention, the phase-holding device is constructed to hold a set phase difference or a set phase angle between the first shaft and second shaft constant during a motor-shutdown phase or stop-start phase.

For holding the phase difference, for example, mechanical locking can be used. However, a constant phase angle between the first shaft and the second shaft can be maintained with an adjustment device or a control device in combination with a phase setting device.

The motor shutdown phase can be a time interval during which the engine is shutdown by turning off the ignition. However, the time interval of the short-time motor shutdown during the red phase of a stoplight or the "stalling" of the engine can also be designated with the engine shutdown phase.

According to another exemplary embodiment of the present invention, a synchronization device is provided that has a passive sensor. The passive sensor is also arranged relative to one of the first active sensors and the second active sensor on at least one of the first shaft and the second shaft.

The passive sensor can increase the accuracy of an active sensor. For example, the timing chain can be monitored by a passive sensor. Because the timing chain can have certain tolerances that can influence the information detected with the active sensors due to aging effects and wear, for example, with a passive sensor information can be determined, with which the tolerances can be equalized.

According to another exemplary embodiment of the present invention, the synchronization device is designed for use in a braking system.

According to yet another exemplary embodiment of the present invention, at least one of the sensors, for example, the first active sensor, the second active sensor, and the third sensor is integrated in the camshaft adjuster.

Thus, the camshaft adjuster can be exchanged as one unit together with the sensors.

Above, many constructions of the invention were described with reference to a synchronization device. These constructions apply accordingly also for the method for the synchronization for shafts in an engine, for the computer-readable memory medium, and for the program element.

As a basic idea of the invention, it can be clearly seen that by maintaining the synchronization or the synchronicity by use of EVT components during the engine stopped phase, the time period for the synchronization of the control device can be eliminated for all motor startups, also optionally for the initial motor startup. The period of the motor startup thus can be halved for all subsequent startups relative to a typical start-up process. The expense for assembling a synchronization device can also be reduced. Furthermore, the efficiency of an engine can be improved relative to conventional engines to the extent that the NEFZ (new European driving cycle) cycle consumption is reduced by a stop-start that is acceptable to customers due to the synchronization device. Thus, for example, two revolutions of the crankshaft until synchronization can be eliminated.

In addition, the generation of noise during the start-up process can be reduced. The synchronization device has a sensor on the camshaft end for the detection of the camshaft position and the crankshaft position. In addition, the synchronization device has a connection or a connection element to an EVT control device or to a control device. In addition, there can be communications of the signals to a motor control device.

The invention can be used where the position of two shafts relative to each other is to be detected. A local approach of the shafts to each other can improve the integration of the sensors. The invention can also be used for hydraulic camshaft adjustment systems. In addition, the invention can be used, e.g., in a braking system.

Crankshaft and camshaft angular position information can be generated indirectly by the evaluation of rotational speed information or the shaft state (a certain number of events within a certain time). The rotational speed information can be determined, for example, through the number of recognized teeth within a time interval. For quick synchronization, on one hand, the camshaft and the crankshaft can be equipped with absolute angle sensors. The absolute angle sensors allow the use of functionality according to the invention already for the initial engine startup of a start-stop system. Here, the initial engine startup is to be understood as the first-time engine startup of a driving cycle.

Here, a start-stop system should be a system that allows synchronization of the camshaft and the crankshaft during the initial engine startup, while a stop-start system should be a system that allows synchronization during operation.

As active sensors, simple sensors can be suitable that have expanded functions. A functional expansion can be, e.g., the recognition or the calculation of the reverse rotation of a shaft, as well as the continuous monitoring of the camshaft angle or the crankshaft angle during the stop-start mode, even at very low rotational speeds that tend toward zero revolutions per minute. Active sensors can also detect movement of a sensor target wheel and in which direction. A sensor target wheel can be a gear attached to a shaft whose movement can be detected, for example, by teeth of the gear passing the sensor. The movement of the gear corresponds to rotational movement of the shaft.

One aspect of the invention consists in providing measurement variables for synchronization of the crankshaft and the camshaft stopping during an engine stopped phase through an expansion of the EVT system. Because the gear and adjustment element are advantageously located at one end of the camshaft, all of the measurement parameters required for synchronization can be detected locally at the gear-side end. However, a sensor can be arranged at any position of a shaft. The camshaft sensor can be located bordering the adjustment element. Through the given connection of the information processing of the EVT to the vehicle control device, e.g., by a bus connection, such as the CAN bus (Controller Area Network), the synchronization information detected locally on the EVT can be transmitted to the control system.

Through the use of an active sensor or an absolute angle sensor, the crankshaft position can be detected. Thus, the initial position of the crankshaft can be made known to the engine control device. The engine control device can be a part of the control device.

Through the use of a triple-shaft gear unit with a fixed gear ratio, the rotational speed, angle, or acceleration of the three shafts of the triple-shaft gear unit can be set relative to each other. The rotational speed determination in the phase adjustment device or in the electric motor can have a high resolution relative to the crankshaft. Through the use of several sensor elements in the phase adjustment device, the angular position recognition can be made rotationally reversible. The triple-shaft gear unit can be a planetary gear unit, wherein the planetary gear unit can have a drive element, an adjustment element, and a driven element. The drive element can be connected to the crankshaft; the adjustment element of the planetary gear unit can be connected to the adjustment shaft; and the driven element can be connected to the camshaft. The rotational speeds of the shafts relative to each other can be fixed by a gear ratio of the gear unit.

In addition, the detection of a starter signal can move the electrical and/or electronic components into readiness before the first rotation of the shafts was detected.

BRIEF DESCRIPTION OF THE PREFERRED DRAWINGS

Below, advantageous embodiments of the present invention are described with reference to the figures.

DETAILED DESCRIPTION OF THE PREFERRED EMBODIMENTS

Figure 1:
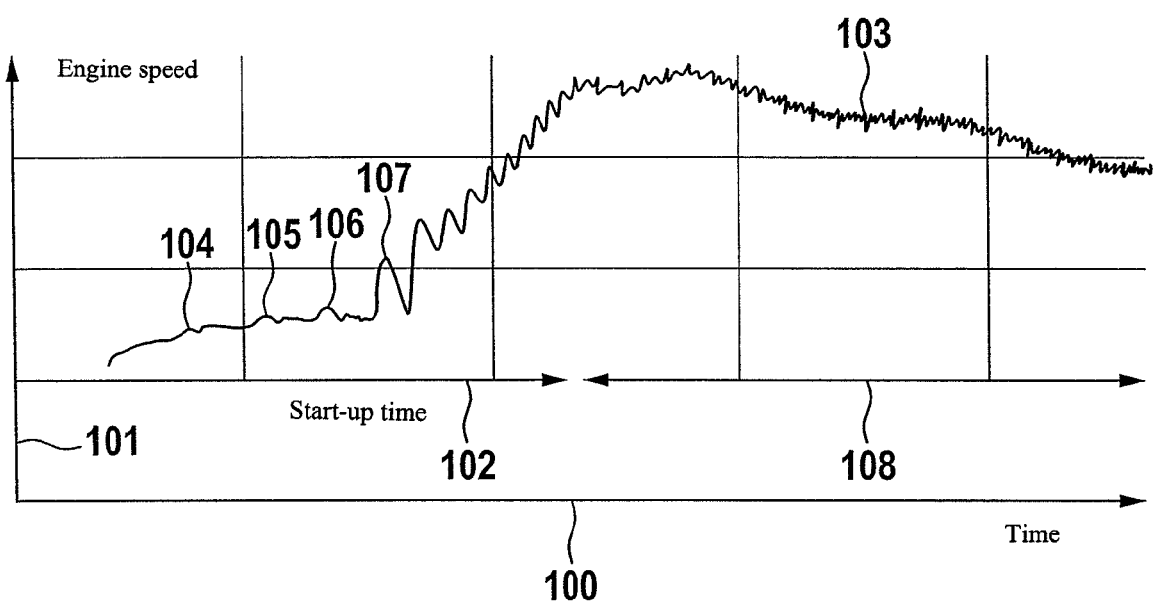
FIG. 1 shows a trace of an engine start-up process.

FIG. 1 shows a trace of an engine start-up process. The trace shown in FIG. 1 shows, as an example, an engine start-up process for an operating oil temperature of 90° C. that is typical for an average stop-start operation case. The X-axis 100 describes the time and the Y-axis 101 describes the engine speed. The start-up time or the interval up to the engine has assumed its normal operation is characterized by the interval 102.

In the trace 103, in a starting region at the left end of FIG. 1 it is to be seen that an engine speed lying in the region of the start-up rotational speed leads to three compressions 104, 105, and 106. The three compressions 104, 105, and 106 do not lead to ignition. The three compressions 104, 105, and 106 lie in the first half of the start-up time interval. Only after the fourth compression 107 is the first ignition process produced and then the engine runs up to the idle rotational speed. The region in which the engine runs at the idle rotational speed is characterized with the interval 108 and is shown in the right part of FIG. 1.

Figure 2:
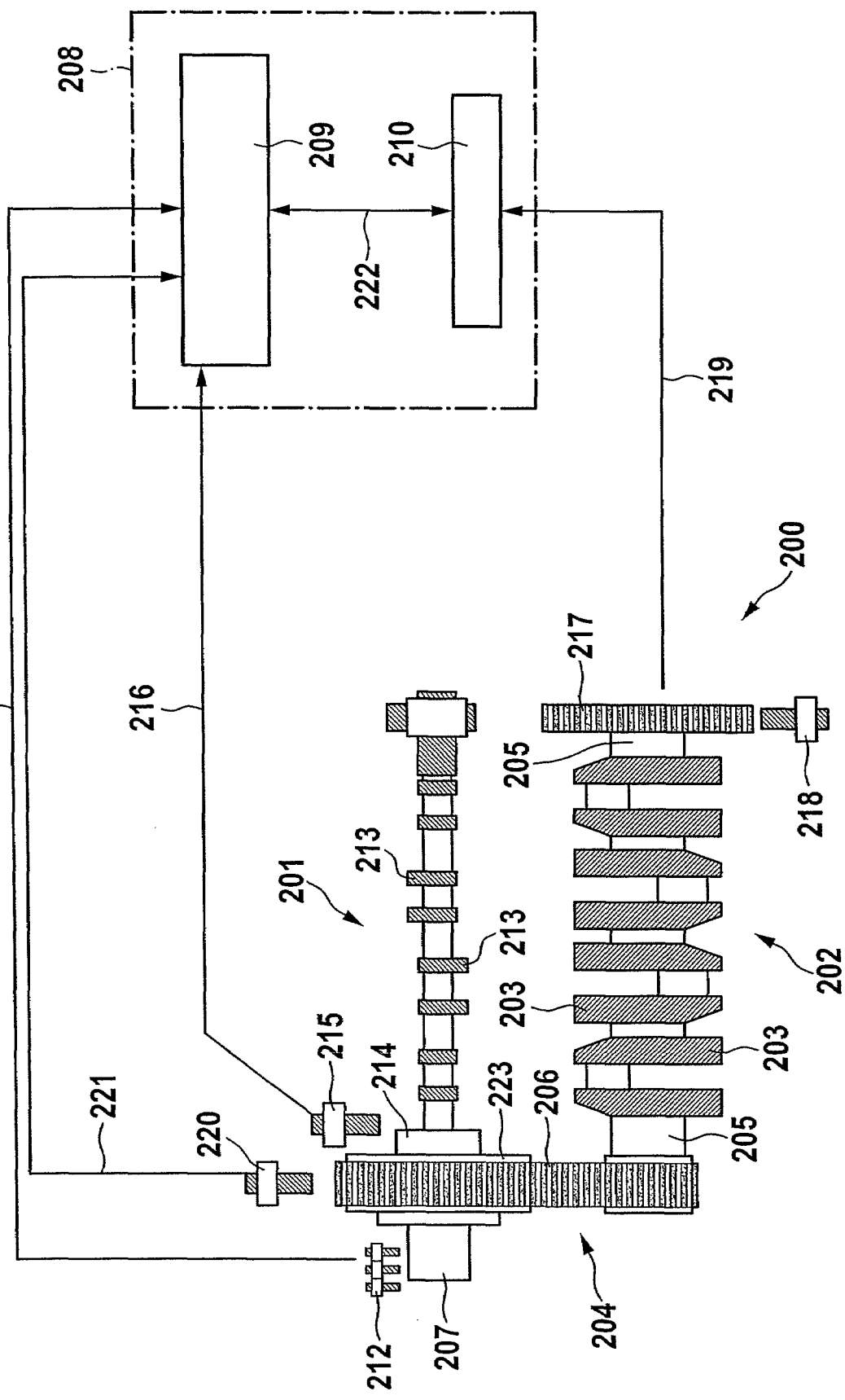
FIG. 2 is a view of an EVT with stop-start system support for quick engine startup according to an exemplary embodiment of the invention.

FIG. 2 shows an EVT system with stop-start system support for a quick engine startup according to an exemplary embodiment of the present invention.

In FIG. 2, the camshaft-crankshaft system of an engine is shown. For this purpose, the camshaft 201 and the crankshaft 202 are shown. The crankshaft 202 has the cranks 203. At the left end, the shaft 205 of the crankshaft 202 extends into the gear unit 204 that is shown only partially in FIG. 2. In FIG. 2, the timing chain 206 is shown that connects the crankshaft 202 to the camshaft 201. The gear ratio between the crankshaft 202 and the camshaft 201 equals 2 to 1. This means that one full rotation of the camshaft 201 requires two full rotations of the crankshaft 202 if there is no adjustment process. The adjustment shaft 207 is arranged opposite the camshaft 201 in such a way that the axes of symmetry of the adjustment shaft 207 and the camshaft 201 coincide. The adjustment shaft 207 is coupled with the camshaft 201 and the crankshaft 202 via the gear unit 204. The timing chain 206 lies across the chain wheel, wherein the chain wheel is integrated into the gear unit 204. Through the use of the adjustment shaft 207, a phase position between the rotational movement of the camshaft 201 and the crankshaft 202 can be set by the gear unit 204.

For adjustment of the adjustment shaft 207, a phase adjustment device or an adjustment element, for example, an electric motor, is arranged on the adjustment shaft 207. The adjustment element is not shown in FIG. 2. The adjuster or the adjustment element is part of the EVT system. In addition to the adjustment element, the EVT system has the control device 208. The control device 208 comprises the EVT control device 209 and the engine control device 210, wherein the engine control device 210 and the EVT control device are connected by the connection 222. The connection 222 can be, for example, a bus, such as, for example, a CAN bus. The function of the EVT control device 209 can also be integrated or partially integrated in the E-motor, the electric motor, or the phase adjustment device, or in the engine control device 210.

Through the use of the connection 211, which can also be constructed as a bus, the control device 208 and, in particular, the EVT control device 209 is connected to the auxiliary sensor 212. The auxiliary sensor 212 can detect a state of the adjustment shaft 207 and can forward it to the EVT control device. The sensor 212 can be integrated into the phase adjustment device. The sensor 212 can be an active sensor that can be, for example, a commutating sensor of the EVT.

The cams 213 are arranged on the camshaft 201. In the region of the gear unit 204, the camshaft position generator 214 is arranged axially on the camshaft. The camshaft position generator 214 is constructed in such a way that with the help of the camshaft sensor 215, a state can be recognized by the rotational movement of the camshaft. Through the use of the connection 216 that also can be constructed as a bus line, the state information of the shaft state device 215 or the camshaft sensor 215 can be forwarded to the control device 208.

The crankshaft position generator 217 or the sensor target wheel 217 that is arranged axially on the shaft 205 of the crankshaft 202 is shown at the right edge of the crankshaft 202 in FIG. 2. When the crankshaft 202 rotates, the state of the crankshaft 202 can be detected by the crankshaft sensor 218 and can be forwarded to the control device 208 by the connection 219 that can likewise be constructed as a bus, for example, a CAN bus. The crankshaft sensor 218 scans the sensor target wheel 217 according to characteristic features for recognizing the state.

By means of the auxiliary sensor 220 that detects movement of the timing chain 208, sensor information can be forwarded to the control device 208 via the connection 221 that can also be constructed as a bus. All of the information received via the connections 211, 216, 219, 221, and 222 can be evaluated in the control device 208 and forwarded to the adjustment element as a control parameter by the connection not shown in FIG. 2 of the control device 208 to the adjustment element. Thus, a phase difference between the camshaft 201 and the crankshaft 202 can be set.

With respect to sensing by the sensors 212, 220, 218, and 215, there are several arrangement possibilities that will be discussed below.

The adjustment system comprising the adjustment element, the adjustment shaft 207, and the gear unit 204 is connected on the gear unit-side to three shafts without the use of transmission elements. An example for a transmission element is a planetary gear unit. In FIG. 2, the three shafts 207, 201, 202 involve the adjustment shaft 207, the camshaft 201, and the crankshaft 202. With the help of the information of the sensors 212, 220, 215, 218 on these shafts 207, 201, 202 or with the sensors on the EVT components, for example, the adjustment sensor 212, the angle and the rotational speed of the shafts 207, 201, 202 can be determined. Thus, the relative angle between the crankshaft 202 and the camshaft 201 can also be determined. Here, the fundamental gear equation that creates a relationship between the gear ratio of the gear unit 204 and the rotational speed or the rotational angle of the shafts 207, 201, 202 can be used.

In addition to active sensors, additional passive sensors can be used. Through the use of additional passive sensors, the accuracy of determining the phase difference between the crankshaft 202 and the camshaft 201 can be increased. Through the use of additional passive sensors, for example, effects generated through expansion of the timing chain 206 can be eliminated or excluded. Thus, additional shifts in the phase position between the crankshaft 202 and the camshaft 201 can be corrected.

Holding the synchronization can be achieved through a passive crankshaft sensor 218, an active camshaft sensor 215, and an active adjustment sensor 212. From the camshaft sensor 215 and the adjustment shaft sensor 212, the rotational angle of the crankshaft 202 can be calculated by the fundamental gear equation. This calculation can be performed in the control device 208. The determined reverse rotational angle can be forwarded to the engine control device 210.

Another possibility for maintaining the synchronization between the camshaft 201 and the crankshaft 202 consists in the use of an active crankshaft sensor 218, a passive camshaft sensor 215, and an active adjustment shaft sensor 212.

Due to the positive-fit connection between the crankshaft 202 and the timing chain 206 and the gear ratio between the crankshaft 202 and the camshaft 201 of 2 to 1, the crankshaft angle information is transmitted to the EVT gear chain wheel 223 in a relative way via the control drive 206. On the EVT gear chain wheel 223, the crankshaft angle information is detected with the crankshaft auxiliary sensor 220. The relative transmission of the information can be taken over, e.g., by one of the chain wheel-side end stops of the gear unit of the camshaft adjuster or a phase adjustment device. As not shown in FIG. 2, when the camshaft adjuster is mounted, these stops are mounted on the camshaft 201 such that they are oriented in a defined way to the crankshaft 202. Detection of the crankshaft angular position is here performed on a component connected rigidly to the chain wheel side of the EVT gear unit.

Alternatively, the timing chain 206, the timing belt 206, or the gear drive 206 can be used to transfer a characteristic crankshaft feature to the chain wheel 323. Here, the characteristic crankshaft feature could be encoded several times on the timing drive 206 according to the length of the timing drive 206. For example, every x-th chain element of the timing drive 206 could have an enlarged tab that could be evaluated by sensors. The position of the chain element of the timing chain 206 or the position of the chain element relative to the crankshaft reference is given by the mounting or can be determined from the comparison of the sensor information of the crankshaft sensor 218 and the crankshaft auxiliary sensor 220 or the crankshaft sensor 218 and the camshaft sensor 215 under consideration of the adjustment angle. The crankshaft angular position is detected on a component connected directly to the chain wheel side of the EVT gear unit 204.

A third possibility for holding the synchronization of the camshaft 201 and the crankshaft 202 consists in an active crankshaft sensor 218, an active camshaft sensor 215, and a passive adjustment sensor 212. In this configuration, the crankshaft 202 and also the camshaft 201 are installed with a sufficiently precise signal resolution. Through the evaluation of the high-resolution crank angle and the high-resolution cam angle, the relative rotational angle or the phase difference can be calculated directly.

Another example for holding the synchronization of the camshaft 201 and the crankshaft 202 is possible through the construction of all of the sensors 212, 220, 215, 218 as active sensors.

Furthermore, holding the synchronization of the camshaft 201 and the crankshaft 202 is also possible through a passive crankshaft sensor 218 and an active adjustment shaft relative sensor for the crankshaft or optionally the camshaft. An adjustment shaft relative sensor here should detect the phase difference between the camshaft 201 and the crankshaft 202 directly. For this purpose, an adjustment shaft relative sensor that is known, for example, from WO 2004/020795 can be used.

Another example for holding the synchronization of the camshaft 201 and the crankshaft 202 is possible through an active crankshaft sensor 218 and an active adjustment shaft relative sensor for the crankshaft 202 and for the camshaft 201. In addition, the active adjustment shaft relative sensor can also be arranged between the adjustment shaft 207 and the camshaft 201 or between the adjustment shaft 207 and the crankshaft 202. This configuration is possible if the vehicle is equipped with a quick-start system that requires these active sensors on the crankshaft 202. Here, independent of the crankshaft signals, the EVT with the adjustment shaft relative sensor can deliver an exact calculation of the current relative angle or the phase difference between the camshaft 201 and the crankshaft 202.

The camshaft sensor 215 can be constructed in such a way that it provides sufficient angular resolution or a sufficiently high resolution. For example, for a sufficient angular resolution, the camshaft sensor 215 can have a resolution of more than eight edges and can allow reverse-rotation recognition. Reverse-rotation recognition can be realized by equipping the camshaft sensor 215 with two sensor elements and an evaluation of this information delivered by the two sensors under consideration of the sequence of the known sensor circuits.

Furthermore, the evaluation of the high-resolution active sensors can be performed only at certain phases during operation of the combustion engine. These certain phases can be designated in such a way that the most exact determination possible of the rotational speed and/or the rotational angle is useful and that much information is needed for evaluation. This could be the case, for example, for a low rotational speed when the engine is started or when the engine is stopped.

In the other phases, only small demands may be placed on the accuracy. In these phases, it could be sufficient to use conventional passive sensors. Therefore, the amount of generated information can be reduced, whereby the load on a processor of the control device 208 can be decreased.

With the help of the described sensing possibilities, the phase angle during the entire stop and start phase of a combustion engine can be determined. This current angular information can be used for regulating the phase angle. The phase angle here designates the rotational angle between the camshaft 201 and the crankshaft 202 with respect to an output relationship of the two shafts relative to each other. The regulator can regulate the desired-phase angle that is calculated internally or that is set externally, for example, by the engine control device 210, through the comparison with the current calculated phase angle.

As soon as the adjustment element, for example, an E-motor, mounted on the adjustment shaft 207 can apply the energy to be produced, the phase angle between the crankshaft 202 and the camshaft 201 is regulated when the motor is stopped until the rotational speed of the combustion engine has dropped to zero. In addition, the phase angle can also be regulated. In the subsequent startup of the combustion engine, the phase angle can also be further regulated. Here, the phase angle can be regulated after the recognition of a starter signal, for example, the activation of a gas pedal, after the recognition of a certain rotational speed of the crankshaft, or else also in advance.

For a stationary crankshaft, and also for very low rotational speeds of the crankshaft, the energy to be applied in the adjustment element or the E-motor is usually very high. The usually very high energy introduced into the adjustment element, especially at low rotational speeds, lies at essentially relatively high dynamic and static moments of the camshaft. For the activation of the valve springs, the highest forces are produced by a cam 213. If the adjustment element is not in the position, due to load moments that are too high, to perform an adjustment for a stationary crankshaft, that is, a crankshaft not driven by the combustion engine, or for a low rotational speed of the crankshaft, the introduction of energy is limited statically or dynamically. The introduction of energy is also limited when the needed energy could damage the adjustment element. The introduction of energy can be limited in various ways. The energy can be limited by:

monitoring a camshaft position
monitoring a load moment
monitoring the rotational speed of a camshaft/crankshaft/adjustment shaft
monitoring of the moment of the adjustment element, e.g., E-motor
monitoring a current
monitoring a voltage
monitoring a pulse duty ratio.

The energy can and should be limited in all variants with reference to temperature, for example, the oil temperature, outside temperature, etc.

For monitoring the camshaft position, the current camshaft position, i.e., the angle of the camshaft 201 is evaluated. In a current position of the camshaft 201, if a valve spring is activated with a cam 213, the energy introduced into the adjustment element is limited statically or dynamically as a function of the position of the camshaft. The position of the camshaft 201 here can be determined by the rotational angle of the camshaft.

For monitoring the load moment, a load moment is calculated based on the evaluated camshaft information or the state of the camshaft 201, for example, the rotational speed or the position. In addition, the applied load moments can also be calculated with the use of the information on the crankshaft 202 and the adjustment shaft 207 and also the gear unit 204. Furthermore, a direct measurement of the load moment can be performed, for example, through a moment measurement shaft. Based on models, the moments can also be estimated from the information of the power introduced over time. Starting at a defined threshold of the load, static or dynamic limiting is possible.

Monitoring the rotational speed of the camshaft/crankshaft/adjustment shaft can be performed by observing the rotational speed of the camshaft, the rotational speed of the crankshaft, and/or the rotational speed of the adjustment shaft of the adjustment system. In this way, static/dynamic limiting is possible. For example, for recognizing the rotational speed of the crankshaft at a level of zero revolutions per minute, the applied power can be set to zero. In other words, this means that, when the shaft is at a standstill, the phase position of the camshaft 201 relative to the crankshaft 202 is not regulated.

Based on models, by monitoring the adjustment element moment or the current or the voltage or the pulse duty ratio in the control device 208, the moment of the adjustment element or the electric motor can be calculated. For this purpose, for example, the required currents, voltages, and/or pulse duty ratios can be evaluated over time and can be calculated into a power. Starting at a certain threshold or, in general, as a function of this applied power, the dynamic or static limiting can be selected. Alternatively or also in parallel to the regulation of the phase angle between the crankshaft 202 and the camshaft 201, other measures can also be performed for holding or for the regulated adjustment of the phase between the crankshaft 202 and the camshaft 201.

The expected new desired angular position of the crankshaft 202 and the camshaft 201 can be started up for the next engine startup by the control device 208 already during the engine shutdown process. Therefore, the time for reaching the desired angle can be shortened for the next engine startup.

Intake and exhaust valve control times can be used to further shorten the start-up time. Here, the goals are control times with small overlap and also control times with highly effective compression, i.e., intake flow point close to the bottom dead center.

High angular resolution can be guaranteed with a crankshaft auxiliary sensor trigger wheel that is not shown in FIG. 2 and a camshaft sensor trigger wheel 214 with at least eight edges. The shaft state device is constructed in such a way that the shaft state device provides at least eight edges, edge changes, or pulses for one full shaft rotation.

For recognition, one or more of the sensor target wheels 217, 214, 223 can be constructed from permanent-magnet material or ferritic material. The shaft state device has a sensor target wheel, wherein the sensor target wheel is made from permanent-magnet material or ferritic material.

The housing of the crankshaft auxiliary sensor 220 and/or the housing of the camshaft sensor 215 can be integrated into an EVT component that is fixed relative to the cylinder head of the engine. For example, the crankshaft auxiliary sensor 220 or the camshaft sensor 215 can be integrated into the electric motor housing. Therefore, an additional seal of the sensor housing can be eliminated.

In addition, it is to be noted that, as used herein, the word "comprise" does not exclude additional elements or steps, and "a" or "an" does not exclude a plurality. Furthermore, let it be noted that features or steps that have been described with reference to one of the embodiments above can also be used in combination with other features or steps of other embodiments described above. Reference symbols in the claims are not to be considered as restrictive.

The invention claimed is:

1. Synchronization device for a camshaft adjuster, comprising:
   a control device; a first active sensor for determining an angular position of a first shaft;
   a second active sensor for determining an angular position of a second shaft or for determining a phase position of the first shaft relative to the second shaft;
   a third sensor for determining an angular position of a third shaft;
   wherein the first active sensor is adapted to provide information on the angular position of the first shaft to the control device;
   wherein the second active sensor is adapted for providing information on the angular position of the second shaft or the phase position between the first shaft and the second shaft to the control device;
   wherein the third sensor is adapted to provide information on the angular position of the third shaft to the control device;
   wherein the first active sensor and the second active sensor are adapted to recognize a rotational speed of the shaft at least between one reference value for a rotational speed of the shaft and a standstill of the shaft; and
   wherein the first active sensor and the second active sensor are adapted to recognize a reversal of a rotational direction of the shaft; and
   wherein the control device is adapted to provide a control signal for setting a given phase difference between the first shaft and the second shaft.

2. Synchronization device according to claim 1, wherein the first active sensor and the second active sensor are adapted to allow continuous monitoring of the angular position of the first shaft and the angular position of the second shaft or the phase position of the second shaft during a stopped phase of rotation of the first shaft and the second shaft.

3. Synchronization device according to claim 1, wherein the third sensor is an active sensor.

4. Synchronization device according to claim 3, further comprising:
   an adjustment element;
   wherein the adjustment element is coupled with the third shaft; and
   wherein the third shaft is coupled kinematically with the first shaft and with the second shaft;
   wherein the adjustment element is adapted to set a given phase angle between the first shaft and the second shaft by accelerating or by braking the third shaft.

5. Synchronization device according to claim 4, wherein the adjustment element is an electric motor.

6. Synchronization device according to claim 4, wherein an energy supply to the adjustment element can be limited statically or dynamically.

7. Synchronization device according to claim 4, wherein the adjustment element comprises a sensor selected from the group comprised of the first active sensor, the second active sensor, and the third sensor.

8. Synchronization device according to claim 1, further comprising:

a phase holding device that is adapted to maintain the given phase difference between the first shaft and the second shaft.

9. Synchronization device according to claim 4, wherein the adjustment element is adapted to set a phase difference between the first shaft and the second shaft during an engine shutdown process.

10. Synchronization device according to claim 1, wherein the synchronization device is constructed for becoming activated at a rotational speed of the engine between a reference rotational speed of the engine and a standstill of the engine.

11. Synchronization device according to claim 1, wherein at least one of the first active sensor, the second active sensor, and the third sensor is constructed as a magnetic field sensor.

12. Synchronization device according to claim 1, further comprising:
a memory device that is adapted to store a phase difference between the first shaft and the second shaft during a standstill of the engine.

13. Synchronization device according to claim 1, further comprising:
a passive sensor;
wherein, in addition to at least one of the first active sensor or the second active sensor, the passive sensor is arranged on at least one of the first shaft or the second shaft.

14. Synchronization device according to claim 1, wherein the synchronization device is adapted for use in a brake system.

15. Synchronization device according to claim 1, wherein at least one of the sensors selected from the group of sensors comprised of the first active sensor, the second active sensor, and the third sensor is integrated in the camshaft adjuster.

16. Method for synchronizing shafts in an engine during an engine start-up phase or an engine stopped phase, comprising:
determining an angular position of a first shaft by a first active sensor;
determining an angular position of a second shaft by a second active sensor; or
determining a phase position between the first shaft and the second shaft;
determining an angular position of a third shaft by a third sensor;
wherein the first active sensor and the second active sensor are adapted to recognize a rotational speed of a shaft at least between a reference value for the rotational speed of the shaft and a standstill of the shaft;
wherein the first active sensor and the second active sensor are adapted for recognizing a reversal of a rotational direction of the shaft;
providing information on the angular position of the first shaft to a control device;
providing information on the angular position of the second shaft or the phase position between the first shaft and the second shaft to the control device;
providing information on the angular position of the third shaft to the control device; and
providing a control signal for setting a given phase difference between the first shaft and the second shaft.

17. Method according to claim 16, further comprising:
setting the given phase difference between the first shaft and the second shaft by an adjustment element.

18. Method according to claim 16, further comprising:
maintaining the given phase difference between the first shaft and the second shaft by a phase holding device.

19. Method according to claim 16, further comprising:
setting the phase difference between the first shaft and the second shaft during an engine shutdown process.

20. Method according to claim 16, further comprising:
activating a synchronization device at a rotational speed of the engine between a reference rotational speed of the engine and the standstill of the engine.

21. Method according to claim 16, further comprising:
storing a phase difference between the first shaft and the second shaft.

22. Computer-readable memory medium on which a program is stored for synchronizing shafts in an engine during an engine start-up phase or an engine stopped phase, wherein the program controls the following processing steps executed by a processor:
determining an angular position of a first shaft by a first active sensor;
determining an angular position of a second shaft by a second active sensor; or
determining a phase position between the first shaft and the second shaft;
determining an angular position of a third shaft by a third sensor;
wherein the first active sensor and the second active sensor are adapted to recognize a rotational speed of the shaft at least between a reference value for the rotational speed of the shaft and a standstill of the shaft;
wherein the first active sensor and the second active sensor are adapted to recognize a reversal of a rotational direction of the shafts;
providing information on the angular position of the first shaft to a control device;
providing information on the angular position of the second shaft or the phase position between the first shaft and the second shaft to the control device;
providing information on the angular position of the third shaft to the control device; and
providing a control signal for setting a given phase difference between the first shaft and the second shaft.

23. A processor having a program element for synchronization of shafts, wherein the program element comprises a program for synchronizing shafts in an engine during an engine start-up phase or an engine stopped phase, wherein the program controls the following processing steps executed by the processor:
determining an angular position of a first shaft by a first active sensor;
determining an angular position of a second shaft by a second active sensor; or
determining a phase position between the first shaft and the second shaft;
determining an angular position of a third shaft by a third sensor;
wherein the first active sensor and the second active sensor are designed to recognize a rotational speed of a shaft at least between a reference value for the rotational speed of the shaft and the standstill of the shaft
wherein the first active sensor and the second active sensor are designed to recognize a reversal of the rotational direction of the shaft;
providing information on the angular position of the first shaft to a control device;
providing information on the angular position of the second shaft or the phase position between the first shaft and the second shaft to the control device;
providing information on the angular position of the third shaft to the control device; and
providing a control signal for setting a given phase difference between the first shaft and the second shaft.

* * * * *